July 18, 1961
H. E. F. PEYTON
2,992,693
DRIVE SHAFT LOCK FOR AUTOMOTIVE VEHICLES
Filed Nov. 4, 1957
2 Sheets-Sheet 1
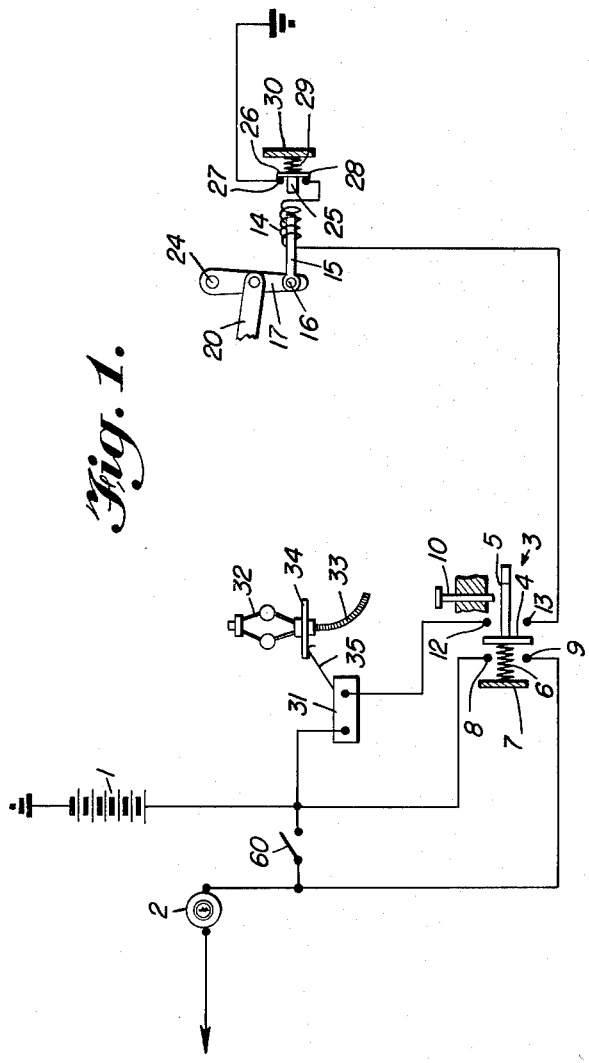
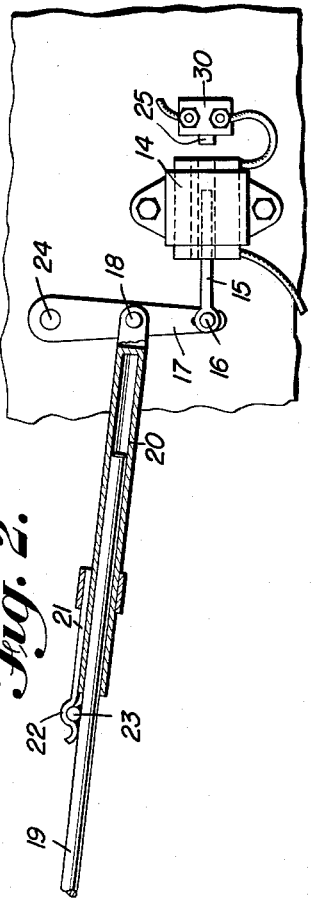
INVENTOR
Harvey E. F. Peyton
BY *Stevens, Davis, Miller + Mosher*
ATTORNEYS

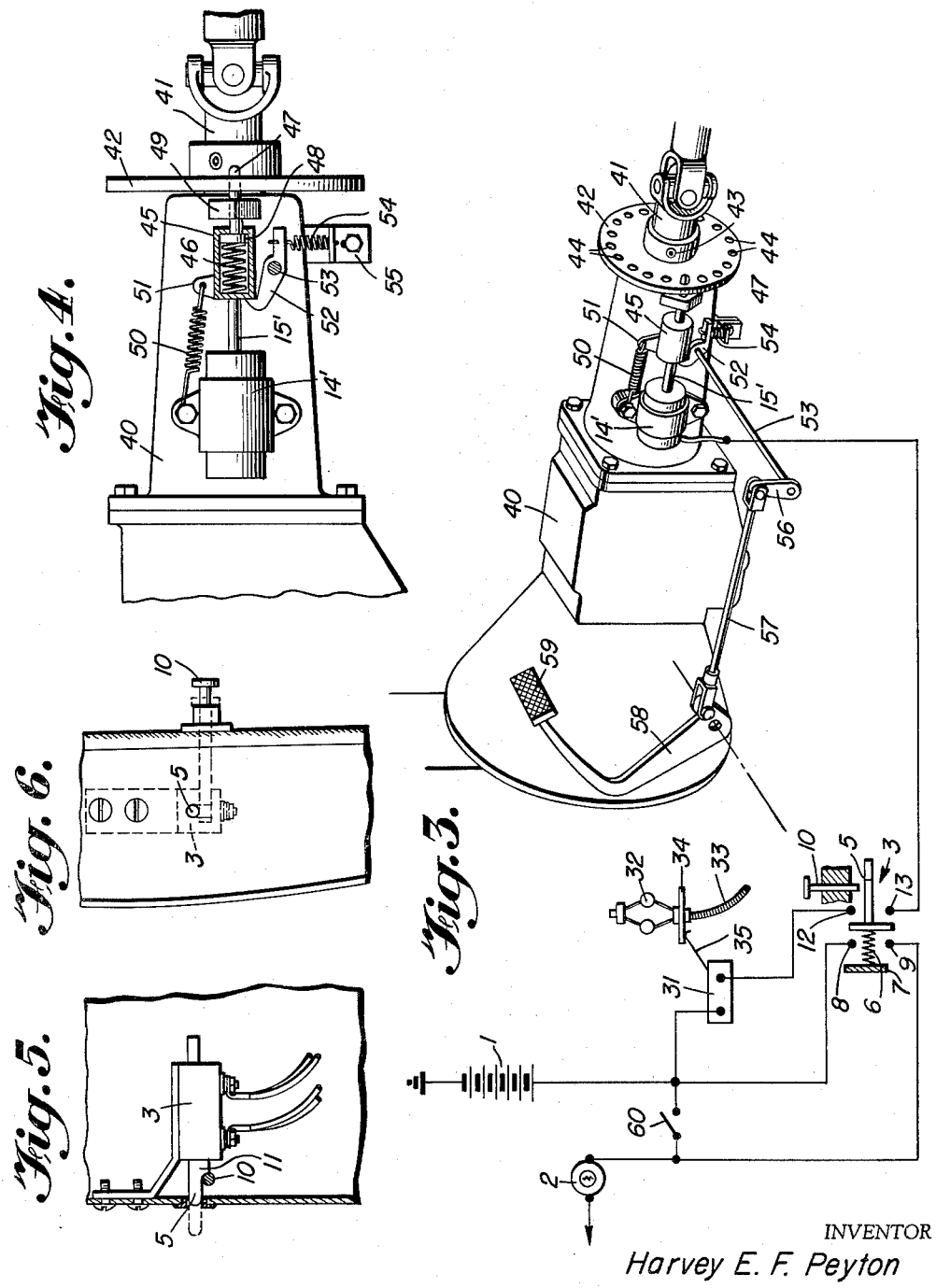

United States Patent Office 2,992,693
Patented July 18, 1961

2,992,693
DRIVE SHAFT LOCK FOR AUTOMOTIVE VEHICLES
Harvey E. F. Peyton, Lascassas, Tenn.
Filed Nov. 4, 1957, Ser. No. 694,240
5 Claims. (Cl. 180—82)

The present invention relates to automotive vehicles such as automobiles, busses, trucks, etc., and in particular to a locking mechanism associated with the drive shaft or transmission of such vehicles.

Most of the late-model automobiles having automatic transmission are also provided with a "park" position in which the portion of the transmission connecting with the rear wheels is locked in position so as to implement the conventional hand brake. When parking the automobile for relatively short periods of time, many people will employ this "park" position as the sole means for locking the vehicle in position. Sometimes, however, a careless operator will leave his automobile thinking that the transmission is in the "park" position, when, in fact, it is in the neutral position; of course, in such a circumstance, and where the automobile is situated on terrain having a small incline or slope, the vehicle may tend to roll from its initial position against another vehicle or against a pedestrian causing consequent injury or damage.

Therefore, it is a principal object of the present invention to provide a mechanism which will automatically place the transmission in the "park" or equivalent position whenever the operator leaves the vehicle in a stationary position.

Another object of the present invention is to provide a mechanism of the type referred to above which can be incorporated into automotive vehicles having the so-called conventional or manual shift.

Other and further objects and advantageous features of this invention will hereinafter more fully appear in connection with the detailed description of the drawings in which FIGURE 1 is a diagrammatic view showing the basic electrical circuit as might be employed with a vehicle having an automatic transmission;

FIGURE 2 is an elevation view, partly in section, showing the connection employed between the automatic transmission lever and its operating rod;

FIGURE 3 is a modified form of FIGURE 1, partly in perspective, showing the incorporation of the basic electrical circuit into the transmission of a vehicle having a so-called conventional or manual shift;

FIGURE 4 is an elevation view, partly in section, showing the details of the locking means associated with the conventional transmission;

FIGURE 5 is a sectional view through a portion of the door frame of an automotive vehicle showing the circuit breaking switch and associated locking mechanism as employed in the electrical circuit of the present invention;

FIGURE 6 is a fragmentary elevation of the door frame showing the external structural arrangement of the elements as they would appear looking from the left-hand side of FIGURE 5.

Referring to the drawings in detail, in FIGURE 1, reference numeral 1 designates a battery which connects with an ignition switch 2 through a door switch 3. The door switch 3 is similar to the conventional spring urged switch which may be used to actuate the overhead light when one of the vehicle doors is opened. Door switch 3 has a spring urged connector bar 4 which is attached to one end of a slidable rod 5, the latter being urged towards the right, as it appears in FIGURE 1, by means of a spring 6, which bears against the connector bar 4 and a stationary support 7 (which would be the casing of the switch 3). When the door is closed, the rod 5 and connector bar 4 will be urged towards the left such that connector bar 4 will engage contact points 8 and 9 thus completing the circuit from the battery 1 to the ignition switch 2. As shown in FIGURES 5 and 6, the door switch 3 is provided with a locking bolt 10, which in its extreme left-hand position as shown by dotted lines in FIGURE 6, will engage a suitable abutment 11 on the rod 5 so as to maintain contact between connector bar 4 and contact points 8 and 9 even when the door has been opened. The door referred to herein is the left-hand front door or driver's door.

Now, assuming that the vehicle has come to a complete stop, when the door on the driver's side is opened, the contactor bar 4 will be urged towards the right, as it appears in FIGURE 1. This movement will open the circuit to the ignition switch 2 and turn off the motor to the vehicle, if this has not already been done by the operator. Also, the contactor bar 4 will move to the right so as to engage contact points 12 and 13. The latter action will place the solenoid 14 in series with the battery 1 so as to energize this solenoid and pull the rod 15 to the right. The rod 15 is pivotally attached at one end 16 to the transmission lever 17 so as to rotate the lever to the "park" position, regardless of the position of the hand shift adjacent the steering wheel. This latter effect is accomplished by the inter-position of a telescopic joint between the pivotal connection 18 on the transmission lever 17 and the rod 19 which normally connects with the selector handle adjacent the steering wheel. As shown in FIGURE 2, this telescopic connection consists of a hollow shaft 20 which slidably engages the end of the rod 19. A leaf spring 21 which is attached to the hollow shaft 20 engages at its free end 22 a ball or ring portion 23 which is welded or secured to the rod 19.

Under normal operating conditions, movement of the selector handle by the operator will cause movement of the rod 19 and consequent rotation of the transmission lever 17 about its pivotal axis 24, with the hollow shaft 20 maintaining the same relation with rod 19, as shown in FIGURE 2. Thus, movement of the handle will normally effect a change to any desired gear without any effect being produced by the mechanism associated with the present invention. However, when the solenoid 14 is energized by the movement of the door switch 3 to its extreme right-hand position, as shown in FIGURE 1, and providing that the transmission lever has not previously been placed in the "park" position, rod 15 will cause immediate movement of the transmission lever 17 to the right so as to cause disengagement between spring 21 and the engageable portion 23 of the rod 19. Thus, when the operator returns to the vehicle, it will be necessary to turn the selector handle to the "park" position to cause reengagement between the spring 21 and engageable portion 23 thereby permitting subsequent normal operation of the automatic transmission selector.

In addition to the primary function of the solenoid 14, as described above in relation to the movement of the transmission lever 17, a secondary function is to break the circuit between the solenoid and the battery 1 after the transmission lever has been moved to the "park" position; for this latter purpose, the extreme right-hand end of the rod 15, as it appears in FIGURE 1, is adapted to press against the left-hand end of a spring urged plunger 25 such that a connector bar 26 attached to the end of the plunger 25 and normally engaging contact points 27 and 28 is moved away from the contact points 27 and 28 so as to interrupt the ground circuit from the battery 1 through the solenoid 14. Connector bar 26 is normally urged against the contact points 27 and 28 by means of a spring 29 which coacts between the connector bar 26 and the casing of switch 30 which encloses these elements.

As a safety feature it is desired to include a means for preventing energizaton of the solenoid 14 when the automotive vehicle is in motion. Therefore, in FIGURE 1 there is also shown another micro-switch 31 connected in series between the battery 1 and the solenoid 14. This micro-switch 31 is operated by a speed-governor type of device 32 which connects with the speedometer through a cable 33. A lower disc 34 on the speed responsive device 32 engages an arm 35 on the micro-switch 31 such that in the FIGURE 1 position, which represents a stationary condition of the vehicle, the contact points in the interior of the switch 31 are engaged. However, if the automotive vehicle were in motion, the action of the speed-responsive and governor-type mechanism 32 would be such that the plate 34 would be moved vertically upward causing the arm 35 to move upwardly also, opening the micro-switch 31 and preventing the energization of the solenoid 14.

The operation of the mechanism of the present invention will now be briefly described in relation to FIGURES 1, 2, 5 and 6 of the drawings. If the operator of the vehicle were to stop the vehicle and then place the automatic selector handle in the "park" position, the switch 30 would be immediately opened and thus, upon subsequent opening of the left-hand, or operator's door, the solenoid 14 would not be energized; opening of the door then would merely break the circuit to the ignition switch 2. Assuming, however, that the operator of the vehicle brings his car to a stationary position and places the automatic transmission handle in a position other than "park," upon the opening of the operator's door, the circuit to the ignition switch 2 would first be broken and then the circuit to the solenoid 14 would be completed with the subsequent energizing of the solenoid 14 such that the transmission lever 17 would be moved to the park position followed by the breaking of the circuit to the solenoid 14 through the opening of the switch 30. Again, if the gears were in the neutral position, and the vehicle were moving at a slow rate of speed, and if the operator's door were subsequently open, the circuit to the ignition switch 2 would be opened and the motor, of course, would be stopped, but the circuit to the solenoid 14 would not be energized since the switch 31 would be opened through the action of the governor-type mechanism 32.

In the modification shown in FIGURES 3 and 4 the basic electrical circuit components are substantially the same as those shown in FIGURE 1. However, in the case of this embodiment, it is necessary to modify the structure of the conventional type of transmission by including additional elements in order to incorporate therein the principle of the present invention. Therefore, there is shown in these figures a conventional transmission, generally designated as 40, from which a rearwardly extending drive shaft 41 will connect with the conventional gearing arrangement associated with the rear wheels; the latter is considered conventional and hence is not illustrated in the drawings. A circular plate or disc 42 is secured (or keyed) to the drive shaft 41 by means of a set screw 43. This disc 42 has a plurality of small holes 44, 44 etc., which extend around the periphery of the disc adjacent the outer edge thereof. A solenoid 14' is suitably secured or bolted to the housing of the transmission 40. A rod 15' which is slidably received within the solenoid 14', and which constitutes the armature thereof, is adapted to be urged towards the right, as it appears in these figures, when the solenoid 14' is energized through the action of the door switch 3. The rod 15' has a hollow cylindrical extension 45 in which is received a spring means 46. Another rod 47 having an enlarged head 48 mounted within the hollow cylinder 45 projects outwardly from the hollow cylinder so as to pass through one of the various holes 44 in the disc 42. A suitable guide means 49 is secured to the housing of the transmission 40 so as to maintain axial alignment of the rod 47 at all times. Spring means 46 permits the rod 47 to yield when one of the holes 44 is not in proper position with respect to the end of the rod 47; subsequent movement of the disc 42 thereafter will permit the spring 46 to force the rod 47 into the disc 42 thereby locking the shaft 41 against rotation. A spring 50 is secured between an upwardly extending flange portion 51 on the cylindrical member 45 and a fixed point on the housing 40 so as to urge the rod 15' (and associated structure) towards the left, as it appears in FIGURES 4 and 5. A locking pawl 52 is keyed to a transverse shaft 53 which is mounted for rotation on suitable supports provided within the frame of the vehicle. A spring means 54 is attached between one end of the pawl 52 and a stationary bracket 55 suitably secured to the housing 40 (or to any other suitable location within the vehicle). As shown in FIGURE 4, the locking pawl 52 and shaft 53 are urged in a lockwise direction by means of the spring 54 such that, upon subsequent de-energization of the solenoid 14', the shaft 15' and its associated structure will be locked in the FIGURE 4 position. At the other end of shaft 53 there is keyed an arm 56 which is pivotally attached at its outer end to a rod 57 which, in turn, is pivotally attached to a portion of the clutch lever 58. Depression of the clutch pedal 59 will cause rotation of the clutch lever 58 and a subsequent movement of the rod 57, arm 56, shaft 53 and locking pawl 52 so as to permit the return of the arm 15' and its associated structure to the left under the action of the spring 50. The sequence of operations for the mechanism shown in FIGURES 3 and 4 is substantially the same as for that described in relation to FIGURES 1 and 2.

If for any reason the operator of the vehicle should wish to disable the automatic locking mechanism of the present invention, as for example, when it might be desired to move the vehicle in a reverse direction with the operator's door open, the rod 10 may be pushed inwardly prior to the opening of the door so as to prevent the door switch 3 from actuating the solenoid 14 (or 14').

In accordance with the description set forth above, opening of the operator's door will effect two different results (1) the drive shaft lock will be energized (if not already engaged), and (2) the circuit to the ignition 2 will be interrupted. In some circumstances, however, it may be desirable not to interrupt the ignition after the operator has left the vehicle, even though it might still be desired to insure that the drive shaft lock will be engaged. For example, in the cold weather it might be advantageous to leave the motor running after parking the vehicle and after departing therefrom, so that, with the heater on during the absence of the operator, the interior of the vehicle will be maintained sufficiently warm; in this instance, it would be preferred that the drive shaft lock be engaged during the absence of the operator from the vehicle. Also, where the vehicle must be intermittently stopped a large number of times during long periods of continuous use, as in the case of deliveries, etc., it would be desirable to keep the motor running continuously; simultaneously, it would be advantageous to insure that the automatic drive shaft lock be engaged each time that the operator departs from the vehicle. Therefore, there is shown in FIGURES 1 and 3 a switch 60 which is connected in parallel with the contact points 8 and 9. This switch 60, which might be located under the dashboard or in any other relatively inaccessible location, when closed, would permit the motor to continue running even after the operator's door were opened. Nevertheless, it should be apparent that the solenoid 14 or 14' would still be energized when the door was opened. Of course, if the above type of arrangement were desired on a permanent basis, the door switch 3 could be re-designed or replaced by another switch without the contact points 8 and 9, or the contact points 8 and 9 could be permanently bridged such that opening the door would have no effect whatsoever upon the ignition switch of the vehicle.

Other and further modifications of the present invention, apart from those shown or suggested herein, may be made within the spirit and scope of this invention.

What is claimed is:

1. Means for automatically locking the drive shaft of an automotive vehicle comprising a solenoid movable when energized to lock the drive shaft in a fixed position, a first switch and a second switch connected in series with each other and in circuit between said solenoid and the electrical battery of said vehicle, means actuated in response to the departure of the operator from said vehicle for closing said first switch and for energizing said solenoid when said second switch is closed, and means operatively connected to said second switch and actuated in response to the movement of said vehicle for maintaining said second switch open when said vehicle is in motion.

2. Means for automatically locking the drive shaft of an automotive vehicle comprising a solenoid movable when energized to lock the drive shaft in a fixed position, a first switch and a second switch connected in series with one another and in circuit between said solenoid and the electrical battery of said vehicle, means connected to said first switch and operated in response to the opening of a door in said vehicle for closing said first switch and for energizing said solenoid when said second switch is closed, and means operatively connected to said second switch and actuated in response to the movement of said vehicle for maintaining said second switch in its open position when said vehicle is in motion.

3. In an automotive vehicle of the type having an automatic transmission including a transmission lever for connecting the drive shaft selectively to at least one drive position, a neutral position, and a park position wherein the drive shaft is locked against rotation, a solenoid mounted within the frame of said vehicle adjacent one end of said transmission lever and having therein a movable armature pivotally attached at one end to said transmission lever, an electrical circuit connecting said solenoid with an electrical battery, a first switch and a second switch connected in series with each other and located in the circuit leading from said solenoid to said battery, means responsive to the opening of a vehicle door in said vehicle to close said first switch and to energize said solenoid when said second switch is closed whereby, upon energization of said solenoid, said transmission lever will be moved to said park position, and means operatively connected to said second switch and actuated in response to the movement of said vehicle for maintaining said second switch in its open position when said vehicle is in motion thereby preventing said solenoid from becoming energized when said vehicle is in motion.

4. In an automotive vehicle of the type having an automatic transmission including a transmission lever one connecting the drive shaft selectively to at least one drive position, a neutral position, and a park position wherein the drive shaft is locked against rotation, a selector mechanism accessible to the operator of the vehicle, and a rod interconnecting said selector mechanism to said transmission lever for permitting movement of said transmission lever to one of said positions through the movement of said selector mechanism, the improvement which comprises a telescopic connection interposed between said transmission lever and the end of said rod which normally connects with said transmission lever, said telescopic connection consisting essentially of a hollow sleeve slidably receiving said end of said rod and being pivotally attached to said transmission lever, a yieldable locking means secured to said sleeve and engaging an abutment on said rod for maintaining said rod and said sleeve in a fixed position when said vehicle is operating in a normal manner, a solenoid mounted within the frame of said vehicle adjacent one end of said transmission lever and having therein a movable armature pivotally attached at one end to said transmission lever, an electrical circuit connecting said solenoid with an electrical battery, a first normally-open switch located in the circuit leading from said solenoid to said battery and responsive to the opening of a door in said vehicle to close the circuit between said battery and said solenoid, a second switch in said circuit for opening said circuit when said vehicle is in said motion, a third switch in said circuit for opening the same subsequent to the energization of said solenoid, and means responsive to the movement of said first switch for interrupting the ignition circuit of said vehicle.

5. In an automotive vehicle having a conventional gearing system including a disengageable clutch and a manually operated shift lever, the improvement which comprises a disc keyed to the drive shaft of said vehicle, said disc having therein a plurality of holes arranged in substantially parallel relation with respect to the central rotational axis of said disc and being substantially equally spaced on said disc adjacent the periphery thereof, a solenoid secured to the frame structure of said vehicle and having therein an armature movable towards and away from said holes, an extension on said armature for projecting into one of said holes and for locking said drive shaft when said solenoid is energized, an electrical circuit connecting said solenoid with a battery, a door switch in said circuit for closing said circuit and energizing said solenoid in response to the opening of a door in said vehicle, a locking means for holding said armature against movement subsequent to the energization of said solenoid, and means responsive to the subsequent movement of said clutch means for releasing said armature locking means.

References Cited in the file of this patent

UNITED STATES PATENTS

| | | |
|---|---|---|
| 1,288,906 | Jensen | Dec. 24, 1918 |
| 1,427,212 | Keller | Aug. 29, 1922 |
| 1,664,042 | McGinley | Mar. 27, 1928 |
| 2,672,203 | Brown | Mar. 16, 1954 |
| 2,740,947 | Davies | Apr. 3, 1956 |
| 2,823,755 | Hall | Feb. 18, 1958 |